(12) United States Patent
Adoline et al.

(10) Patent No.: US 7,350,628 B2
(45) Date of Patent: Apr. 1, 2008

(54) HIGH FORCE LOCKING SPRING

(75) Inventors: Jack W. Adoline, Toledo, OH (US); Bruce J. Fondren, Ida, MI (US)

(73) Assignee: Barnes Group Inc., Bristol, CT (US)

( * ) Notice: Subject to any disclaimer, the term of this patent is extended or adjusted under 35 U.S.C. 154(b) by 442 days.

(21) Appl. No.: 10/911,196

(22) Filed: Aug. 4, 2004

(65) Prior Publication Data

US 2006/0027956 A1  Feb. 9, 2006

(51) Int. Cl.
*B65H 59/10* (2006.01)

(52) U.S. Cl. .......................... 188/67; 267/70

(58) Field of Classification Search ................. 188/67, 188/265, 300; 267/70
See application file for complete search history.

(56) References Cited

U.S. PATENT DOCUMENTS

| | | | | |
|---|---|---|---|---|
| 689,855 | A * | 12/1901 | Copeland | 279/47 |
| 1,637,383 | A * | 8/1927 | Livergood | 285/123.12 |
| 1,682,342 | A * | 8/1928 | Kraft | 108/23 |
| 1,970,624 | A * | 8/1934 | Recker | 248/412 |
| 2,184,358 | A * | 12/1939 | Moore | 285/302 |
| 2,455,439 | A * | 12/1948 | Page | 188/67 |
| 2,947,556 | A * | 8/1960 | Wenger | 403/290 |
| 3,458,234 | A * | 7/1969 | Bates | 297/423.38 |
| 4,078,778 | A * | 3/1978 | Hubweber | 267/64.12 |
| 4,185,539 | A * | 1/1980 | Stratienko | 91/45 |
| 4,277,197 | A * | 7/1981 | Bingham | 403/104 |
| 4,469,201 | A * | 9/1984 | Rastetter et al. | 188/67 |
| 4,577,732 | A * | 3/1986 | Gottling | 188/67 |
| 4,589,301 | A * | 5/1986 | Griner | 74/586 |
| 4,606,442 | A * | 8/1986 | Paton et al. | 188/381 |
| 4,621,783 | A * | 11/1986 | Wier | 248/245 |
| 4,728,072 | A * | 3/1988 | Mitchell | 248/406.1 |
| 4,799,818 | A * | 1/1989 | Sudimak et al. | 403/107 |
| 4,991,675 | A | 2/1991 | Tosconi et al. | |
| 5,011,104 | A * | 4/1991 | Fang | 248/125.8 |
| 5,730,239 | A | 3/1998 | Holter | |
| 5,890,556 | A | 4/1999 | Shearn et al. | |
| 5,921,359 | A * | 7/1999 | Holle | 188/300 |
| 5,975,228 | A | 11/1999 | Parfitt | |
| 6,412,606 | B1 * | 7/2002 | Wu | 188/68 |
| 6,634,627 | B1 * | 10/2003 | Stevenson | 267/64.12 |
| 6,748,878 | B2 * | 6/2004 | Chen | 108/147.13 |

* cited by examiner

*Primary Examiner*—Robert A. Siconolfi
(74) *Attorney, Agent, or Firm*—Fay Sharpe LLP; Brian E. Turung

(57) ABSTRACT

A spring system for relatively displacing elements attached to end mounts of the spring system. The spring system includes a housing having an axis, an internal chamber, and axially opposite bottom and top ends, a spring rod coaxial with the axis and positioned within the internal chamber and having an inner end in the housing and an outer end axially outwardly of the top end. A guide member is provided on the inner end of the rod member to support the rod member for reciprocation axially of the housing between retracted and extended positions relative thereto. A locking arrangement is provided to engage the spring rod and inhibit axial movement of the spring rod.

31 Claims, 3 Drawing Sheets

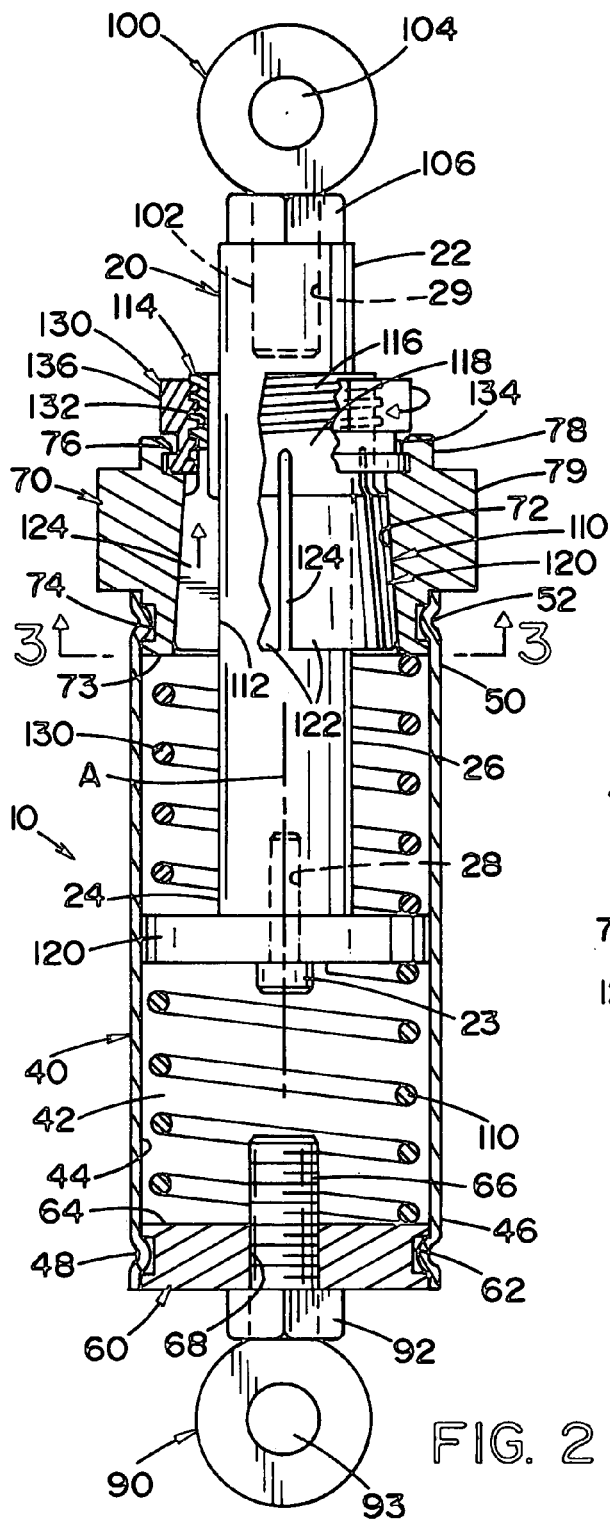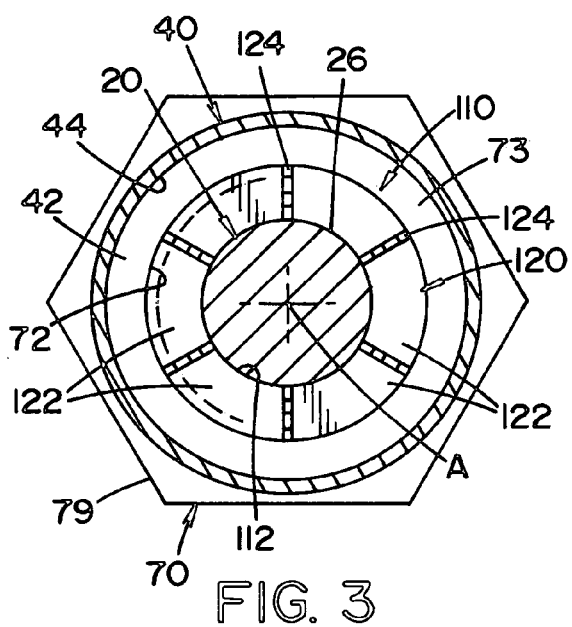
FIG. 2
FIG. 3

HIGH FORCE LOCKING SPRING

The present invention relates to spring systems, and more particularly to a spring and rod assembly that can be easily locked and unlocked.

BACKGROUND OF THE INVENTION

The present invention relates to spring systems such as a spring and rod assembly that exerts a compressive force and/or expansional force. The spring systems embodying the present invention are useful in motor vehicles for facilitating in the opening of closure members such as luggage compartment lids, engine compartment hoods, hatchbacks, doors, etc; various types of industrial applications such as the opening and/or closing of container lids, use in natural gas or petroleum pump applications, use in industrial machinery, etc.; however, the spring system can be used in many other applications.

Spring systems are used in various applications, for example, lifting, opening, and/or damping applications. Typical applications include lifting a lid hinged to a stationary base. Other applications include lifting and/or balancing the hood of a car or trunk or the hatchback of an automobile. Another application of the spring system includes damping the closing of a door hinged to a stationary frame. Still another application includes a shock absorber for an oil well pumping unit.

Many of the spring systems used are pneumatic or gas springs to assist in the opening and/or closing motion. Many of these types of spring systems contain either gas or hydraulic fluid to control forces and piston speeds. Other types of spring systems include one or more springs that have been developed to produce a particular load versus deflection curve based on particular applications.

Although various types of spring systems have been developed for use in various types of applications, some uses of the spring system requires that the spring system be locked in position. For instance, when an oil well pump is transported to a site, the walking beam and horse head of the oil well pump is typically locked in position during transport so as to minimize damage to the moving components of the oil well pump. In another application, when a lid, vehicle hood or the like is partially or fully opened, an operator may desire that the lid or hood be locked in place so that the hood or lid does not move to a closed position or more open position. In still another application, various components of industrial machinery that are connected to spring systems may need to be locked in place during maintenance, down time, etc. In the past, additional components were needed to lock a component into place, thus making the locking and unlocking process complicated, cumbersome and time consuming.

In view of the present state of the art, there remains need for a spring system that can be easily locked and unlocked in various states of compression.

SUMMARY OF THE INVENTION

The present invention provides an improved spring system which overcomes the above referred-to difficulties and others with regard to such spring systems heretofore available. The spring system in accordance with the invention is particularly adapted for lifting or pivoting one component relative to another component at a controlled rate. In accordance with one embodiment of the invention, the spring system provides a lift mechanism for hinged covers, hatches and the like. In accordance with another and/or alternative embodiment of the invention, the spring system provides a lift mechanism for a vehicle hood. In accordance with still another and/or alternative embodiment of the invention, the spring system provides a lift mechanism and/or a shock absorbing mechanism for various types of industrial applications. In accordance with yet another and/or alternative embodiment of the invention, the spring system applies a linear and/or non-linear force during the expansion and/or compression of the spring system. In accordance with still another and/or alternative embodiment of the invention, the spring system is able to support significant loads while maintaining strength over a large number of operating cycles. In accordance with still yet another and/or alternative embodiment of the invention, the spring system provides a mechanical assembly that can yield controllable forces over a long period of use and control the spring forces during extension and/or compression of the spring system. In accordance with a further and/or alternative embodiment of the invention, the spring can be designed to control the rate at which the spring system expands and/or contracts. In accordance with still a further and/or alternative embodiment of the invention, the spring can be easily locked and unlocked in various states of compression.

In accordance with one aspect of the present invention, the spring system includes a locking arrangement that limits, inhibits or locks the position of the spring rod relative to the housing of the spring system. The locking arrangement enables a user to limit, inhibit or prevent movement of the spring rod once the spring rod has moved to a desired position relative to the housing. The locking arrangement is typically designed to releasably lock the spring rod in position relative to the housing. The locking arrangement is also typically designed to easily and conveniently lock the spring rod in position relative to the housing. The locking arrangement can be used for a variety of applications to enhance the use of the spring system. For instance, the locking arrangement can be used to lock a lid, hatch or vehicle hood in a partially or fully open position so as to limit, inhibit or prevent further movement of the lid, hatch or vehicle hood until the locking arrangement is disengaged. In another application, the locking mechanism can be used to lock in position various component of industrial machinery, oil well pumps, or other types of equipment when such equipment is not in use, is being repaired, and/or is being transported. As can be appreciated, many other applications of the locking arrangement on the spring system can be used. In still another and/or alternative embodiment of the invention, the locking arrangement includes a tapered locking mechanism. In one aspect of this embodiment, the tapered locking mechanism includes a sleeve that at least partially encircles a portion of the spring rod. The sleeve is designed to engage the spring rod to limit, inhibit or prevent movement of the spring rod relative to the housing of the spring system. In one non-limiting design, the sleeve is designed to be partially compressed so as to form a friction engagement with a portion of the spring rod. The sleeve can also include a threaded section that enables a bolt or other threaded member to be threaded on at least a portion of the sleeve to cause the sleeve to form or terminate a frictional engagement with the spring rod. In yet another embodiment of the invention, the spring rod includes one or more ribs, slots and/or openings that are designed to be engaged by the locking arrangement to limit, inhibit, or prevent the movement of the spring rod relative to the housing of the spring system. As can be appreciated, many other configurations of the locking arrangement can be used.

In accordance with another and/or alternative aspect of the present invention, the spring system can be a gas spring and/or include at least one spring. When one or more springs are used in the spring system, the one or more springs typically build potential force as the one or more springs are compressed and release force when the springs are expanded. Similarly, when a gas spring is used, the gas builds up pressure when the gas chamber is compressed and releases such compressive forces when the gas chamber expands. In one embodiment of the invention, the spring system includes one spring on one side of the piston of the spring system. In another embodiment of the invention, the spring system includes a plurality of springs on one side of the piston of the spring system. In one aspect of this embodiment, the spring system includes two springs on one side of the piston of the spring system. In another and/or alternative aspect of this embodiment, the spring system includes three springs on one side of the piston of the spring system. In still another and/or alternative aspect of this embodiment, the spring system includes four springs on one side of the piston of the spring system. In each of the embodiments set forth above, no springs or one or more springs can be position on the other side of the piston of the spring system. As can be appreciated, one side of the spring system can include a gas chamber and the other side of the spring system can include one or more springs. As can also be appreciated, one or more sides of the spring system can include both a gas chamber and one or more springs. In another and/or alternative embodiment of the invention, the compression of the plurality of springs at similar points during the compression of the spring system produces a generally linear load versus deflection curve during the compression of the spring system. In still another and/or alternative embodiment of the invention, the compression of the plurality of springs at different points during the compression of the spring system produces a non-linear load versus deflection curve during the compression of the spring system. In yet another and/or alternative embodiment of the invention, the expansion of the plurality of springs at similar points during the expansion of the spring system produces a generally linear load versus deflection curve during the expansion of the spring system. In still another and/or alternative embodiment of the invention, the expansion of the plurality of springs at different points during the expansion of the spring system produces a non-linear load versus deflection curve during the expansion of the spring system. In yet another and/or alternative embodiment of the invention, a plurality of the springs are wound in differing directions with respect to another spring. The differing direction of winding of a plurality of the springs facilitates in packaging the multiple springs in a housing. The differing direction of winding of a plurality of the springs also facilitates in allowing for proper compression and/or expansion of the two or more springs in a housing. In yet another and/or alternative embodiment of the invention, a plurality of the springs have a different load versus deflection curve. In still yet another and/or alternative embodiment of the invention, a plurality of the springs have a similar load versus deflection curve. In a further arid/or alternative embodiment of the invention, a plurality of the springs have different lengths. In a still further and/or alternative embodiment of the invention, a plurality of the springs have similar lengths. In yet a further and/or alternative embodiment of the invention, a plurality of the springs have a different spring rate. In still a further and/or alternative embodiment of the invention, a plurality of the springs have a similar spring rate. In a still yet a further and/or alternative embodiment of the invention, a plurality of the springs are formed from differing wire thickness and/or different materials. In another and/or alternative embodiment of the invention, a plurality of the springs are formed from a similar wire thickness and/or the same materials. In one non-limiting design, one or more of the springs is made of music wire (ASTM A228) and/or 302 stainless steel. As can be appreciated, one or more springs could be formed of other metals, plastic materials and/or composite materials for use in certain applications. As can also be appreciated, the particular thickness of the wire used for each of the springs, the particular material used for the springs, the inner and outer diameter of the each of the springs, the number of windings of each spring, the direction of winding of two or more springs, the number of springs used in the spring system, the length of each of the springs, the manner in which the springs are oriented with respect to one another, the spring rate of each of the springs, and other factors will be in part dependent on the function and end use of the spring system. The particular type of spring and the physical properties of the springs are selected in a spring system to produce a load verses deflection curve that matches a particular application for the spring system.

In accordance with still another and/or alternative aspect of the present invention, the spring system includes at least one spring guide to reduce the incidence of spring buckling during the operation of the spring assembly when one or more springs are used in the spring system. Spring buckling typically occurs when the springs are being compressed. The spring guide is designed to inhibit or prevent such buckling during the operation of the spring assembly. The spring guide can also or alternatively be designed to control and/or limit the movement of the springs to thereby inhibit or prevent the springs becoming tangled within the housing of the spring system. The spring guide can also or alternatively be designed to control and/or limit the movement of the springs to reduce or prevent reorientation of two or more springs with respect to one another. The spring guide can be designed to fully or partially extend the full longitudinal length of the spring when the spring is in a compressed position in the housing of the spring system. In another and/or alternative embodiment of the invention, at least one spring guide can be designed to be in substantially fixed positioned at an interior end of the housing of the spring system, or be designed to at least partially move within the housing. In one aspect of this embodiment, the spring guide is an end plug that is shaped and sized to be inserted into the void inner region of at least one of the springs. In still another and/or alternative embodiment of the invention, the spring guide at least partially functions as a stop to limit the amount of compression of one or more springs in the spring system. The length of the spring guide can be selected to at least partially set the fully compressed position of the spring system. In this arrangement, the spring guide can be used to prevent or inhibit over compression of one or more springs in the spring system and thereby extend the life of the spring system and/or maintain the proper operating conditions of the spring system. In one aspect of this embodiment, the spring guide can function as a damper to inhibit or prevent damage to the components of the spring system during rapid compression of the spring system. In one non-limiting design, the end of the spring guide can include a compressible or semi-compressible end to absorb force upon contact via compression.

In accordance with still another and/or alternative aspect of the present invention, the spring system includes a spring rod which is adapted to extend and retract relative to a housing of the spring system. Multiple end configurations can be used to adapt the spring rod to a variety of mounting applications. In one embodiment of the invention, the housing has an internal chamber that is designed to encase the one or more springs of the spring system. Typically the shape of the internal chamber is similar in shape to the shape of one or more springs; however, this is not required. The cross-sectional shape and size of the internal chamber is selected to enable the one or more springs to be compressed and uncompressed during the operation of the spring system. The cross-sectional shape and size of the internal chamber can also be selected so as to inhibit or prevent buckling of one or more springs during compression or uncompression of the one or more springs. In still another and/or alternative embodiment of the invention, housing has an internal chamber that is designed to encase a gas of the spring system. In this embodiment, the housing includes one or more seals to maintain the pressure of the gas in the housing during the compressing and decompressing of the gas during the operation of the spring system. The shape of the internal chamber of the housing that contains the gas can be any shape.

In one non-limiting design, the housing has a generally cylindrically shaped internal chamber. In another and/or alternative embodiment of the invention, the exterior shape of the housing is selected for a particular application and/or look. In one non-limiting design, the exterior shape of the housing is generally cylindrical. In still another and/or alternative embodiment of the invention, the housing is made of a resilient material. The material of the housing must be durable enough to maintain the one or more springs in the internal chamber of the housing during multiple compressions and uncompressions of the one or more springs, and/or to withstand the compressive force of the gas during the use of the spring system. The exterior portion of the housing must also be durable enough to withstand the operating environment of the spring system. Typically the housing is made of a metal material, composite material and/or a plastic material; however, other materials can be used. As can be appreciated, the external surface of the housing can include a protective coating (e.g., polymer coating, paint, etc.) to inhibit or prevent corrosion, scratches and/or other types of damage to the housing. In still another and/or alternative embodiment of the invention, the housing includes an end connector connected to one end of the housing. The end connector is designed to connect one end of the housing to a structure that incorporated the use of the spring system. In one aspect of this embodiment, the end connector is interchangeable with another type of end connector to enable the end of the housing to be connected to variety of structures in a variety of ways. The end connector can be connected to or be part of the housing, or be connected or interconnected to the spring rod. In yet another and/or alternative embodiment of the invention, the housing includes one or more closure connectors that are used to facilitate in maintaining the internal components of the spring system within the internal chamber of the housing. The one or more closure connectors can be designed to be removable to allow for maintenance and/or repair of one or more components in the internal chamber of the spring system. In such a design, the one or more closure connectors can include, but are not limited to, set screws, clamps, etc. Alternatively, the one or more closure connectors can be designed to be unremovable. In such a design, the one or more closure connectors can include, but are not limited to, rivets, weld, indents, etc. In still yet another and/or alternative embodiment of the invention, the spring rod has a cross-sectional size and shape to enable the spring rod to move within the internal chamber of the housing. In one non-limiting design, the spring rod has a generally cylindrically shaped body having a diameter that is less than the diameter of a generally cylindrically shaped internal chamber of the housing. In a further and/or alternative embodiment of the invention, the spring rod is formed of a resilient and durable material to enable the spring rod to operate without failure during the selected life of the spring system. The spring rod can be solid, or include one or more hollow inner chambers. The spring rod can have a uniform or non-uniform outer shape. In one non-limiting design, the spring rod includes a generally solid body having a generally cylindrical shape and is formed of a metal, composite material, and/or plastic material. As can be appreciated, the external surface of the spring rod can include a protective coating (e.g., polymer coating, paint, etc.) to inhibit or prevent corrosion, scratches and/or other types of damage to the spring rod and/or internal surfaces of the housing. Additionally or alternatively, the internal surface of the housing can include a lubricative coating (e.g., Teflon and/or other polymer coating, etc.) to facilitate in the movement of the spring rod in the internal chamber of the housing. As can be further appreciated, a lubricant (e.g., oil, grease, silicon, etc.) can be inserted in the internal chamber of the housing to facilitate in the movement of the spring rod in the internal chamber of the housing. In a further and/or alternative embodiment of the invention, the spring rod includes a top end fastener adapted to be connected to a top connector. The top connector is designed to connect one end of the spring rod to a structure that incorporates the use of the spring system. In one aspect of this embodiment, the top connector is interchangeable with another type of top connector to enable the end of the spring rod to be connected to variety of structures in a variety of ways. The top end fastener of the spring rod can be designed to be permanently connected or removably connected to the top connector. In one non-limiting design, the top end fastener includes a threaded section that enables a top connector be to removably connected to the top end fastener.

In accordance with still another and/or alternative aspect of the present invention, the spring system includes one or more rod guides that at least partially guide the movement of the spring rod within the internal chamber of the housing. In one embodiment of the invention, the one or more rod guides can be designed to prevent or inhibit side loading of one or more of the springs, when used, during the compression or uncompression of one or more of the springs. In another and/or alternative embodiment of the invention, one end of spring rod is directly connected or interconnected to a rod guide. In another and/or alternative embodiment of the invention, both ends of the spring rod are directly connected or interconnected to the rod guide. In still another and/or alternative embodiment of the invention, the body of the spring rod includes one or more rod guides. In yet another and/or alternative embodiment of the invention, at least one rod guide has a cross-sectional shape and size that closely matches or is slightly less than the cross-sectional shape and size of the internal chamber of the housing. The thickness of the circular cross-sectional shape is typically sufficient to maintain the rod guide in a proper orientation in the internal chamber of the housing as the spring rod moves within the internal chamber. In still yet another and/or alternative embodiment of the invention, at least one rod guide has an upper and lower surface wherein the upper surface is directly connected or interconnected to the spring rod and the lower surface directly or indirectly engages one or more springs, when used. In a further and/or alternative embodiment of the invention, at least one rod guide has an upper and lower surface wherein the upper surface is directly connected or interconnected to the spring rod and the lower surface directly connects or interconnects with at least one spring guide. In a still further and/or alternative embodiment of the invention, at least one rod guide includes a stop surface adapted to directly or indirectly engage a portion of the housing or a component in the internal chamber of the housing to thereby prevent further movement of the rod guide as the rod guide moves with the spring rod. The stop surface thus defines the fully extended position or compressed position of the spring rod. In one aspect of this embodiment, the stop surface includes a compressible material that at least partially absorbs a force as the stop surface directly or indirectly engages a portion of the housing or a component in the internal chamber of the housing. One non-limiting material is a rubber or plastic material; however, other materials can be used. As can be appreciated, the stop surface need not include a compressible material. If a damping effect is desired or required prior to the stop surface directly or indirectly engage a portion of the housing or a component in the internal chamber of the housing, a spring and/or other compressible material can be placed between the stop surface and the end of the housing. In a still yet further and/or alternative embodiment of the invention, at least one rod guide is made of a durable and resilient material. Such materials include, but are not limited to, plastic, metal, composite material, rubber and the like.

In accordance with still another and/or alternative aspect of the present invention, the spring system includes a fluid control system within the internal chamber of the housing that is designed to at least partially control the rate of the spring rod moving between an extended and nonextended position and/or an nonextended to extended position. Such an arrangement can be used to dampen the spring system. In one embodiment of the invention, the flow of a fluid in the internal chamber of the housing is controlled to in part control the speed of movement of the spring rod. The fluid can be a gas and/or a liquid. In one non-limiting design, the fluid is a gas (e.g., nitrogen, air, inert gas, etc.). Typically the selected fluid does not adversely affect the internal components of the spring system. In one embodiment of the invention, the internal chamber of the housing is divided into at least two sub-chambers by at least one movable component of the spring system. The movable component is designed to at least partially regulate the flow of fluid between at least two of the sub-chambers. This regulation of fluid flow at least partially controls the speed of movement of the spring rod. In one aspect of this embodiment, the movable component includes a rod guide. In one non-limiting design of this aspect, the rod guide is directly or indirectly connected to one end of a spring rod and moves within the internal chamber as the spring rod moves between an extended and nonextended position. As such, the rod guide simulates a piston in the internal chamber of the housing. In another and/or alternative aspect of this embodiment, the movable component includes a valve system that at least partially regulates the flow of fluid between two ends of the movable component. In another and/or alternative embodiment of the invention, the housing of the spring system includes one or more seals to control the fluid flow into and/or out of the internal chamber of the housing and/or within the housing. In one aspect of this embodiment, one or both ends of the housing include a sealing system to inhibit or prevent fluid from flowing into and/or out of the internal chamber of the housing. In another and/or alternative aspect of this embodiment, the housing includes one or more openings to allow fluid to enter and/or exit the internal chamber of the housing. In still another and/or alternative embodiment of the invention, the fluid control system within the internal chamber of the housing regulates fluid between at least two sub-chambers and substantially prevents fluid from flowing into or out of the internal chamber. In this arrangement, a seal is positioned about the spring rod. The seal is designed to inhibit or prevent fluid flowing into or out of the internal chamber of the housing when the spring rod moves between an extended and nonextended position. One or more seals such as, but not limited to, sealing rings can be used to seal the end of the housing. The movable component can include a valve system to at least partially regulate the flow of fluid between at least two sub-chambers as the movable component and spring rod move within the internal chamber. In one embodiment, the movable component includes a seal about the outer perimeter of the movable component to inhibit or prevent fluid from flowing about the outer perimeter of the movable component as the movable component moves within the internal chamber. In another and/or alternative embodiment, the movable component includes one or more openings about the outer perimeter of the movable component to allow fluid to flow about the outer perimeter of the movable component as the movable component moves within the internal chamber. In still another and/or alternative embodiment, the movable component includes one or more openings spaced from the peripheral edge of the movable component to allow fluid to flow through the movable component as the movable component moves within the internal chamber. In one aspect of this embodiment, the movable component includes at least two openings spaced from the peripheral edge of the movable component. In one non-limiting design, one opening allows for a greater fluid flow rate through the opening than one other opening. In another and/or alternative non-limiting design, at least two openings allow for substantially the same fluid flow rate through the two openings. In another and/or alternative aspect of this embodiment, at least one of the openings includes a one way valve to allow fluid to flow in one direction and to inhibit or prevent fluid to flow in an opposite direction. In one non-limiting design, the one way valve inhibits or prevents fluid flow through the valve as the spring rod moves to an extended position and the one or more springs become uncompressed. In such a design, the one way valve can cause the rate of movement of the spring rod to the extended position to slow. In another and/or alternative non-limiting design, the one way valve allows fluid flow through the valve as the spring rod moves to a nonextended position. In such a design, the one way valve allows the rate of movement of the spring rod to the nonextended position to be faster than in the opposite direction. In yet another and/or alternative embodiment of the invention, fluid is allowed to flow into and/or out of a sub-chamber by flowing through one or more openings in the housing. The size of the one or more openings in the housing is selected to allow for a certain fluid flow rate out of an upper sub-chamber as the spring rod moves to an extended position. In one non-limiting design, the upper chamber is formed between the movable component and the end of the housing through which the spring rod passes. As the spring rod moves to an extended position, the upper sub-chamber reduces in size and causes the fluid in the chamber to be forced out through the one or more openings in the housing. The fluid is not allowed to flow in a lower sub-chamber due to the one way valve in the movable component. The low rate of the fluid through the one or more openings in the housing at least partially controls the rate at which the spring rod moves to an extended position. As such, a smaller opening will reduce the rate of movement and a larger opening will allow for a faster rate of movement.

It is accordingly an outstanding object of the present invention to provide an improved spring system that can be locked in a position.

Another and/or alternative object of the present invention is the provision of a spring system that can be easily releasably locked.

Still another and/or alternative object of the present invention is the provision of a spring system for exerting an operating force on a displaceable member at a controlled rate.

Yet another and/or alternative object of the present invention is the provision of a spring system that supplies a consistent force over an extended period of time and maintains strength over a greater number of cycles.

Still yet another and/or alternative object of the present invention is the provision of a spring system that minimizes load losses over time.

A further and/or alternative object of the present invention is to provide a mechanical spring system that can accommodate, selectively, multiple end configurations, thus adapting the spring system for mounting in a wide variety of use applications.

Still a further and/or alternative object of the present invention is the provision of a spring system that has a controlled rate of extension from a compressed state.

These and other objects and advantages will become apparent from the following description taken together with the accompanying drawings.

BRIEF DESCRIPTION OF DRAWINGS

Reference may now be made to the drawings, which illustrate various embodiments that the invention may take in physical form and in certain parts and arrangements of parts wherein;

FIG. 2 is a partial sectional view of the spring system of FIG. 1;

FIG. 3 is a cross-sectional view along line 3-3 of FIG. 2; and,

DETAILED DESCRIPTION OF EMBODIMENTS OF THE INVENTION

Figure 1:
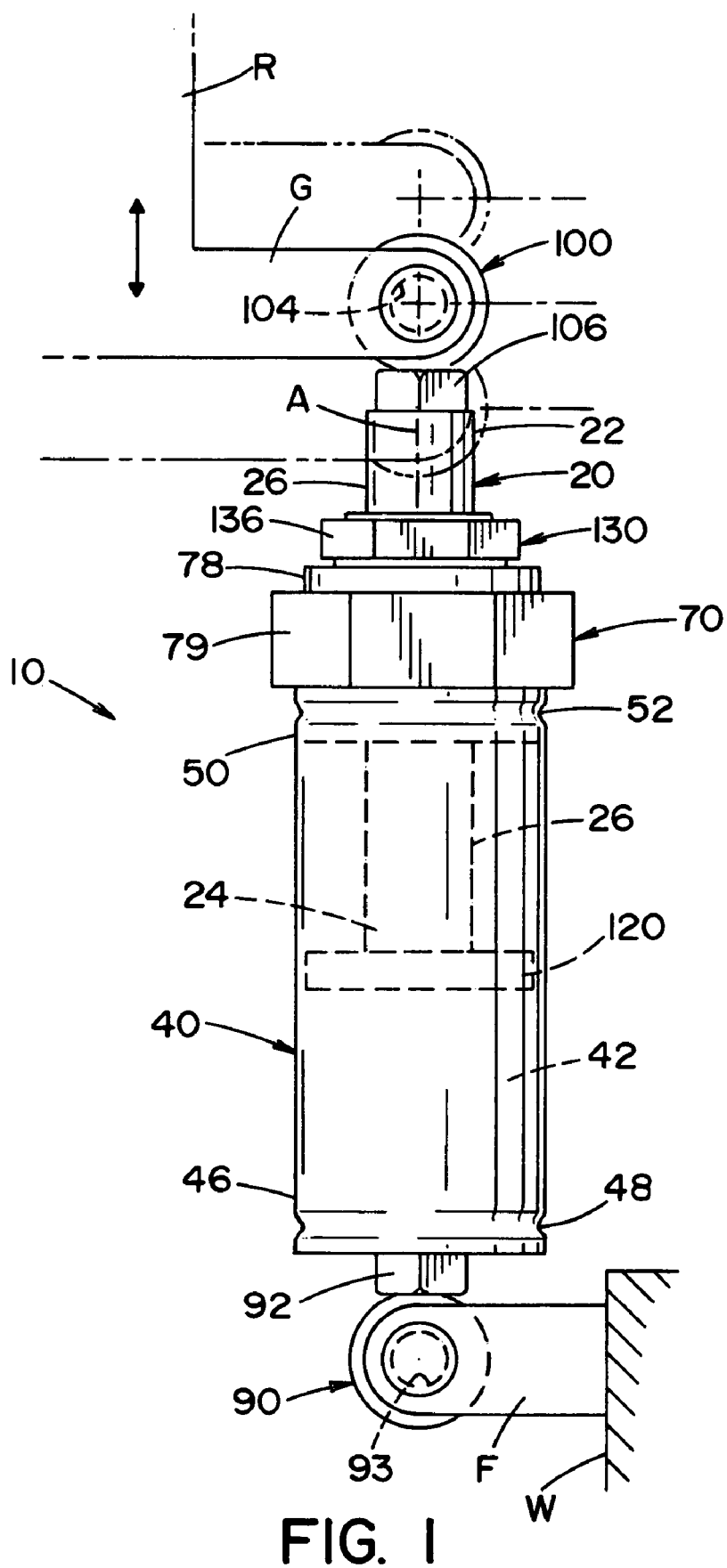
FIG. 1 is an elevation view of a spring system in accordance with the present invention.

Referring now in greater detail to the drawings, wherein the showings are for the purpose of illustrating various embodiments of the invention only, and not for the purpose of limiting the invention, a spring system 10, in accordance with the invention, as shown in FIGS. 1-4 is set forth. As shown in detail in FIG. 2, the spring system 10 has an axis A and includes a spring rod 20 which is axially extendable and retractable relative to a one-piece tubular housing 40. The housing includes an internal chamber 42 having an inner surface 44, and a mount end 46 and an opposite end 50. Spring rod 20 includes an outer surface 26, an outer end 22, and an inner end 24 having a threaded end cavity 28. Inner end 24 is connected to guide member 120 by a screw 23 which is threaded into threaded end cavity 28.

A lower spring 110 is located in internal chamber 42. As can be appreciated, a plurality of lower springs can be positioned in internal chamber 42. As can also be appreciated, a gas could be substituted for or be used in combination with one or more lower springs. The interior surface 44 of internal chamber 42 supports the lower spring to inhibit or prevent the lower spring from buckling during the compression and expansion of the lower spring.

Positioned at mounting end 46 of housing 40 is a tail bushing 60. Tail bushing 60 includes a spring surface 64 and a lock groove 62. The lower spring 110 is captured between the spring surface 64 of tail bushing 60 and a guide member 120. Tail bushing 60 is supported in internal chamber 42 of housing 40 by a crimp 48 on the mount end which form a radially inwardly crimp that engages the lock groove 62 as shown in FIG. 2. Tail bushing 60 is made of a resilient material to withstand the compressive force of the lower spring. The tail bushing can also be made of a material that forms a seal in the mount end of the housing to inhibit or prevent fluid from entering or exiting the internal chamber; however, this is not required. As can be appreciated, the tail bushing can include one or more seals, not shown, to facilitate in sealing the mount end of the housing.

An upper spring 130 is also located in internal chamber.42. The upper spring is axially captured between guide member 120 and a spring surface 73 of a top bushing 70. The upper spring is positioned about spring rod 20. The spring rod facilitates in inhibiting the buckling of the upper spring during compression of the upper spring. As can be appreciated, a plurality of upper springs can be positioned in internal chamber 42. As can also be appreciated, a gas could be substituted for or be used in combination with one or more upper springs. The spring wire diameter, the spring rate, the spring length of upper and lower springs 110 and 130 can be the same or different depending on a particular application.

Figure 4:
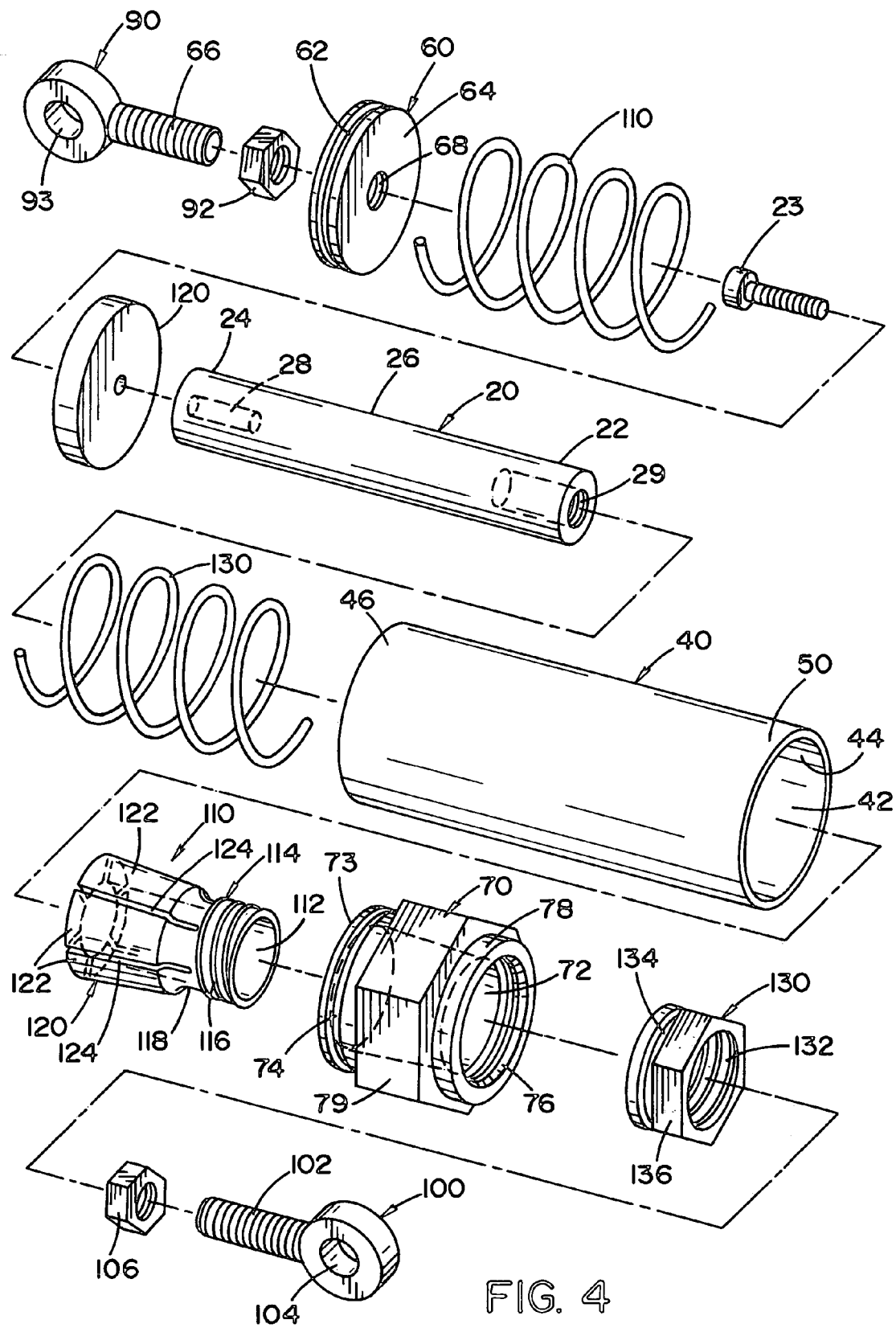
FIG. 4 is an exploded view of the spring system of FIG. 1.

Spring system 10 typically includes the use of a one-piece housing 40 so as to facilitate in the smooth movement of rod 20 and springs 110 and 130 during operation of the spring system; however, this is not required. Tail bushing 60 includes a neck portion 66 having a diameter sized to be received in the interior of spring 110. This neck portion is used to facilitate in positioning spring 110 in the interior of the housing. Connected to tail bushing 60 is a mounting element 90. The mounted element can be formed as part of the tail bushing or be connected to the tail bushing such as by a threaded screw connection or other type of connection. As shown in FIG. 2, the mounting element is threaded onto the tail bushing and secured to the tail bushing by nut 92. As illustrated in FIG. 4, the lower portion of the mounting element forms the neck portion of the tail bushing when the lower portion is threaded onto the tail bushing through opening 68 in the tail bushing. Mounting element 90 includes a mount opening 93 that can be secured to various objects. As shown in FIG. 1, mounting element 90 is pivotally connected to a flange F that extends from wall W. As can be appreciated, the mounting element can be connected in many other ways to an object. As can be appreciated, mounting element 90 can be designed to be removable so as to be replaced with other types of mounting elements so as to modify the assembly for use in a variety of structural environments; however, this is not required.

Positioned in the open end of outer end 50 of housing 40 is a top bushing 70 having a central opening 72. The central opening is sized to allow spring rod 20 to pass therethrough. Bushing 70 includes a locking groove 74 that is used to secure bushing 70 to housing 40. Outer end 50 of housing 40 includes a crimp 52 that forms a radially inwardly crimp which engages the locking groove 74. Bushing 70 includes hexagonally shaped side walls 79 that have a maximum cross sectional size that is greater than the diameter of the opening in housing 40. Spring rod 20 is slidably supported at outer end 50 of housing 40 by top bushing 70 as the spring rod passes through opening 72. The top bushing, in conjunction with rod guide member 120, facilitates in guiding the movement of the spring rod in internal chamber 42 thereby inhibiting and/or preventing side loading of the springs. Bushing 70 can include a sealing ring to inhibit or prevent a fluid such as a gas or liquid from flowing between inner surface 44 of internal chamber 42 and the outer surface of bushing 70; however, the use of a sealing ring is not required. Bushing 70 can also include a rod seal to inhibit or prevent a fluid from flowing between outer surface 26 of spring rod 20 and opening 72 in bushing 70; however, the use of a rod seal is not required.

Connected to rod end 22 of spring rod 20 is a mounting element 100. Mounting element 100 can be connected to rod end 22 in a variety of ways (e.g., threaded connection, welded connection, etc.). As shown in FIGS. 2 and 4, mounting element 100 includes a threaded lower portion 102 that is designed to be threaded into a cavity 29 in rod end 22. A nut 106 is used to secure mounting element 100 to spring rod 20. Mounting element 100 has an opening 104 therethrough for receiving a variety of different mounting components common in the industry including, but not limited to, pins, bolts, screws, hooks, rings, swivels, and the like. As can be appreciated, mounting element 100 can be designed to be removable so as to be replaced with other types of mounting elements so as to modify the assembly for use in a variety of structural environments; however, this is not required.

Guide member 120 is mounted to spring rod 20 and is slidably positioned in internal chamber 42 of housing 40 as spring rod 20 moves relative to housing 50. Guide member 120 is made of suitable material to facilitate such sliding movement. Lubrication can be provided in internal chamber 42 to facilitate in the sliding movement of guide member 120. As will be appreciated from the foregoing description, guide member 120 and top bushing 70 guide support rod 20 for reciprocation in internal chamber 42 of housing 40 so as to maintain minimal breakaway forces for rod 40. Additionally, guide member 120 and top bushing 70 facilitate in maintaining spring rod 20 coaxial with axis A and decrease the effect of side loading on the springs.

As shown in FIG. 2, a locking sleeve 110 is positioned about spring rod 20. The locking sleeve includes an interior passage 112 that is sized and shaped to allow the outer surface 26 of spring rod 20 to pass therethrough. The top portion 114 of locking sleeve 110 includes a threaded region 116 and a tapered surface 118 below the thread region. The bottom portion 120 of the locking sleeve includes a plurality of legs 122 that are separate by slots 124. As shown in FIG. 4, the cross-sectional area of the bottom portion increases. The top portion of locking sleeve 110 and a part of the bottom portion of the locking sleeve are sized and shaped to be inserted into opening 72 of bushing 70. As shown in FIGS. 2 and 4, the cross-sectional area of opening 72 decreases from the bottom to the top of the bushing. A locking nut 130 having a threaded opening 132 is designed to be threaded on threaded region 116 of locking sleeve 110. Locking nut 130 includes a groove 134 that engages a rib 76 in the upper rim 78 of bushing 70. The rib and groove arrangement secures the locking nut to the top of bushing 70 and enables the locking nut to be rotated on the top of the bushing. Locking nut 130 includes hexagonally shaped side walls 136 that have a maximum cross-sectional size that is greater than the diameter of opening 72 in upper rim 78. The top surface of the upper rim is shown in FIG. 2 to have a sloped surface. The sloped surface is used to facilitate in connecting the locking nut to bushing 70.

The operation of the spring system will now be described with reference to FIGS. 1-3. As shown in FIGS. 1-3, spring system 10 is illustrated as assisting in the operation of a device such as an oil well pump. As can be appreciated, the spring system can be used in many other applications. The spring system in this particular application is used a damping spring during the operation of the oil well pump. Mounting element 90 is pivotly connected to flange F that is in turn connected to a wall W that forms a portion of the bottom portion of the oil well pump. Mounting element 100 is also pivotly connected to flange G which in turn is connected to a reciprocating component R of the oil well pump. During the operation of a the oil well pump, the locking sleeve 110 allowed the spring rod 20 to substantially freely move within passage 112 of the locking sleeve. In such a mode, the spring system 10 functions as a standard strut. When the oil well pump is being transported to a different location, or the oil well is to be stopped for maintenance or for some other reason, the spring system 10 can be used to lock the reciprocating component R in place so as to minimize or prevent damage to one or more parts of the oil well pump.

The spring rod 20 is locked in position relative to housing 40 by rotating lock nut 130 as illustrated in FIG. 2. When the lock nut is rotated in a direction that causes the lock nut to be further threaded on threaded region 116 of locking sleeve 110, the locking sleeve is caused to move upwardly into bushing 70 as shown by the arrow in FIG. 2. The tapered opening 72 of bushing 70 causes legs 122 on the bottom portion of the locking sleeve to move together. At a certain point of movement of the legs, the opening in the bottom portion of the locking sleeve will reduce until the legs begin to engage the outer surface of the spring rod. The contact between the legs of the locking sleeve and the outer surface of the spring rod result in a fictional force that locks the spring rod in position. Such contact is best shown in FIG. 3. The spring rod can subsequently be disengaged from the locking sleeve by rotating the locking nut in the opposite direction to cause the locking sleeve to move downwardly in bushing 70. As the locking sleeve moves downwardly, the legs of the locking sleeve move back to their original spaced positioned from one another and result in the opening in the bottom portion of the locking sleeve becomes enlarged. Once the opening in the bottom portion of the locking sleeve has become sufficiently enlarged, the spring rod can once again substantially freely move within the opening of the locking sleeve.

While considerable emphasis has been placed herein on the structures and configurations of the preferred embodiment of the invention, it will be appreciated that other embodiments, as well as modifications of the embodiments disclosed herein, can be made without departing from the principles of the invention. In this respect, it will be appreciated that the spring rod can be used in applications other than those disclosed herein. Similarly, multiple combinations of coaxial and surrounding springs (i.e., two, three, four, etc.) may be configured to meet the desired load versus deflection for a particular application. Likewise, it will be appreciated that a spring rod according to the invention can be secured to relatively displaceable components in any number of different ways. These and other modifications of the preferred embodiments, as well as other embodiments of the invention, will be obvious and suggested to those skilled

Having thus described the invention, it is claimed:

1. A spring system comprising a housing having an axis and an internal chamber that includes axially opposite bottom and top ends, a spring rod coaxial with said axis and at least partially positioned within said internal chamber and having a lower end positioned in said internal chamber and an upper end axially positioned outwardly of said top end, a guide member positioned in said internal chamber and secured to said spring rod so as to at least partially support said spring rod for reciprocation axially in said housing between retracted and extended positions relative thereto, and a locking arrangement designed to releasably lock said spring rod to inhibit or prevent axial movement of said spring rod, at least a portion of said locking arrangement positioned outwardly of said top end of said housing, said locking arrangement including a locking sleeve that comprises a one piece upper section, a lower section and a cavity axially positioned in said upper and lower sections, said cavity of said locking sleeve having a shape and size that enables at least a portion of said spring rod to move in said lower section of said locking sleeve, said lower section of said locking sleeve including a plurality of movable legs designed to movably engage at least a portion of said spring rod to at least partially inhibit or prevent axial movement of said spring rod.

2. The spring system as defined in claim 1, wherein said locking arrangement includes a locking nut that causes said locking sleeve to move axially along said axis of said housing, said axial movement of said locking sleeve in a direction outwardly from said top end of said housing causes a plurality of said moveable legs of said locking sleeve to move toward said spring rod and ultimately to at least partially inhibit or prevent axial movement of said spring rod.

3. The spring system as defined in claim 2, wherein said locking nut is rotatably engaged with said locking sleeve and includes a thread designed to threadably engage a thread on an outer surface of said upper section of said locking sleeve.

4. The spring system as defined in claim 3, wherein said locking arrangement includes a top bushing secured to said top end of said housing, said top bushing including an internal cavity extending axially through said top bushing, said internal cavity having an upper end and a lower end, said locking nut at least partially rotatably positionable at said upper end of said cavity, said internal cavity designed to receive at least a portion of said locking sleeve, said internal cavity having a shape and size to cause a plurality of said moveable legs of said locking sleeve to move toward said spring rod and ultimately to at least partially inhibit or prevent axial movement of said spring rod when said locking nut is rotated in at least one direction to cause said locking sleeve to be drawn toward said locking nut.

5. The spring system as defined in claim 4, wherein said locking nut is rotatably secured to said top bushing.

6. The spring system as defined in claim 5, wherein said internal cavity of said top bushing has a variable cross-sectional area along said longitudinal axis of said top bushing.

7. The spring system as defined in claim 6, wherein said lower section of said locking sleeve has a variable cross-sectional area along said longitudinal axis of said lower section.

8. The spring system as defined in claim 7, wherein said locking arrangement at least partially releasably locks said spring rod by frictionally engaging said spring rod.

9. The spring system as defined in claim 8, including at least one spring extending between said guide member and the bottom end of said housing.

10. The spring system as defined in claim 2, wherein said locking arrangement includes a top bushing secured to said top end of said housing, said top bushing including an internal cavity extending axially through said top bushing, said internal cavity having an upper end and a lower end, said locking nut at least partially rotatably positionable at said upper end of said cavity, said internal cavity designed to receive at least a portion of said locking sleeve, said internal cavity having a shape and size to cause a plurality of said moveably legs of said locking sleeve to move toward said spring rod and ultimately to at least partially inhibit or prevent axial movement of said spring rod when said locking nut is rotated in at least one direction to cause said locking sleeve to be drawn toward said locking nut.

11. The spring system as defined in claim 10, wherein said locking nut is rotatably secured to said top bushing.

12. The spring system as defined in claim 11, wherein said internal cavity of said top bushing has a variable cross-sectional area along said longitudinal axis of said top bushing.

13. The spring system as defined in claim 10, wherein said internal cavity of said top bushing has a variable cross-sectional area along said longitudinal axis of said top bushing.

14. The spring system as defined in claim 1, wherein said lower section of said locking sleeve has a variable cross-sectional area along said longitudinal axis of said lower section.

15. The spring system as defined in claim 1, wherein said locking arrangement at least partially releasably locks said spring rod by frictionally engaging said spring rod.

16. The spring system as defined in claim 1, including at least one spring extending between said guide member and the bottom end of said housing.

17. A method of releaseably locking a spring rod of a spring system comprising:
providing a housing having a longitudinal axis and an internal chamber that includes axially opposite bottom and top ends;
providing a spring rod coaxial that is positioned at least partially in said internal chamber of said housing, said spring rod having a lower end positioned in said internal chamber and an upper end positioned outwardly of said top end;
providing a guide member positioned in said internal chamber of said housing and secured to said spring rod, said guide member supporting said rod member for reciprocation axially in said housing between a retracted and an extended position relative thereto;
providing a locking arrangement that is at least partially secured to said housing, said locking arrangement designed to engage said spring rod to inhibit axial movement of said spring rod, said locking arrangement including a locking sleeve that comprises a one piece upper section, a lower section, a cavity axially positioned in said upper and lower sections and a locking nut, said cavity of said locking sleeve having a shape and size that enables at least a portion of said spring rod to move in said lower section of said locking sleeve, said lower section of said locking sleeve including a plurality of movable legs designed to movably engage at least a portion of said spring rod and to at least partially inhibit or prevent axial movement of said spring rod, said locking nut designed to cause said locking sleeve to move axially along said axis of said housing;

causing axial movement of said locking sleeve in a direction outwardly from said top end of said housing by rotating said locking nut to thereby cause a plurality of said moveable legs of said locking sleeve to move toward said spring rod and ultimately to at least partially inhibit or prevent axial movement of said spring rod.

18. The method as defined in claim 17, wherein said locking nut is rotatably engaged with said locking sleeve and includes a thread designed to threadably engage a thread on an outer surface of said upper section of said locking sleeve.

19. The method as defined in claim 18, wherein said locking arrangement includes a top bushing secured to said top end of said housing, said top bushing including an internal cavity extending axially through said top bushing, said internal cavity having an upper end and a lower end, said locking nut at least partially rotatably positionable at said upper end of said cavity, said internal cavity designed to receive at least a portion of said locking sleeve, said internal cavity having a shape and size to cause a plurality of said moveable legs of said locking sleeve to move toward said spring rod and ultimately to at least partially inhibit or prevent axial movement of said spring rod when said locking nut is rotated in at least one direction to cause said locking sleeve to be drawn toward said locking nut.

20. The method as defined in claim 19, wherein said locking nut is rotatably secured to said top bushing.

21. The method as defined in claim 20, wherein said internal cavity of said top bushing has a variable cross-sectional area along said longitudinal axis of said top bushing.

22. The method as defined in claim 17, wherein said locking arrangement includes a top bushing secured to said top end of said housing, said top bushing including an internal cavity extending axially through said top bushing, said internal cavity having an upper end and a lower end, said locking nut at least partially rotatably positionable at said upper end of said cavity, said internal cavity designed to receive at least a portion of said locking sleeve, said internal cavity having a shape and size to cause a plurality of said moveable legs of said locking sleeve to move toward said spring rod and ultimately to at least partially inhibit or prevent axial movement of said spring rod when said locking nut is rotated in at least one direction to cause said locking sleeve to be drawn toward said locking nut.

23. The method as defined in claim 22, wherein said locking nut is rotatably secured to said top bushing.

24. The method as defined in claim 23, wherein said internal cavity of said top bushing has a variable cross-sectional area along said longitudinal axis of said top bushing.

25. The method as defined in claim 22, wherein said internal cavity of said top bushing has a variable cross-sectional area along said longitudinal axis of said top bushing.

26. The method as defined in claim 25, wherein said lower section of said locking sleeve has a variable cross-sectional area along said longitudinal axis of said lower section.

27. The method as defined in claim 26, wherein said locking arrangement at least partially releasably locks said spring rod by frictionally engaging said spring rod.

28. The method as defined in claim 27, including at least one spring extending between said guide member and the bottom end of said housing.

29. The method as defined in claim 17, wherein said lower section of said locking sleeve has a variable cross-sectional area along said longitudinal axis of said lower section.

30. The method as defined in claim 17, wherein said locking arrangement at least partially releasably locks said spring rod by frictionally engaging said spring rod.

31. The method as defined in claim 17, including at least one spring extending between said guide member and the bottom end of said housing.

\* \* \* \* \*